ical axes of said portions being arranged substantially transversely with one convex and the other concave so that the part cylindrical convex surface of one end of one link mates with one part cylindrical concave surface at the other end of a preceding link when the chain is straight under tension, and enables the chain to withstand greater loads, the U-ends being shaped to permit relative pivoting of the links about an axis substantially transverse to the plane of the link.

United States Patent [19]
Bruce

[11] 4,110,971
[45] Sep. 5, 1978

[54] LINK CHAIN

[76] Inventor: Peter Bruce, "Le Victoria", App. 5e-etage, Bloc D, 13 bd., Princesse Charlotte, M.C., Monaco

[21] Appl. No.: 765,523

[22] Filed: Feb. 3, 1977

[30] Foreign Application Priority Data

Feb. 4, 1976 [GB] United Kingdom ............... 4311/76

[51] Int. Cl.² .......................................... F16G 15/12
[52] U.S. Cl. ........................................... 59/84; 59/90
[58] Field of Search .............................. 59/84, 90, 78

[56] References Cited

U.S. PATENT DOCUMENTS

| | | | |
|---|---|---|---|
| 2,103,972 | 12/1937 | Harris | 59/84 |
| 3,453,823 | 7/1969 | Mundt | 59/90 |
| 3,662,539 | 5/1972 | Florjancic | 59/84 |
| 3,744,239 | 7/1973 | I'Anson | 59/84 |
| 3,796,246 | 3/1974 | Walenta | 59/84 |
| 3,864,906 | 2/1975 | Cullen | 59/84 |

FOREIGN PATENT DOCUMENTS 1,372,354 10/1974 United Kingdom ............... 59/84

Primary Examiner—C.W. Lanham
Assistant Examiner—Gene P. Crosby
Attorney, Agent, or Firm—Mason, Fenwick & Lawrence

[57] ABSTRACT

A link chain, particularly for use as an anchor chain, comprises a plurality of links joined together in sequence, each link including a closed member comprising a pair of facing U-shaped portions, the base of the U at each end of the member having a portion of its inside surface of part cylindrical form, the cylindrical axes of said portions being arranged substantially transversely with one convex and the other concave so that the part cylindrical convex surface of one end of one link mates with one part cylindrical concave surface at the other end of a preceding link when the chain is straight under tension, and enables the chain to withstand greater loads, the U-ends being shaped to permit relative pivoting of the links about an axis substantially transverse to the plane of the link.

9 Claims, 24 Drawing Figures

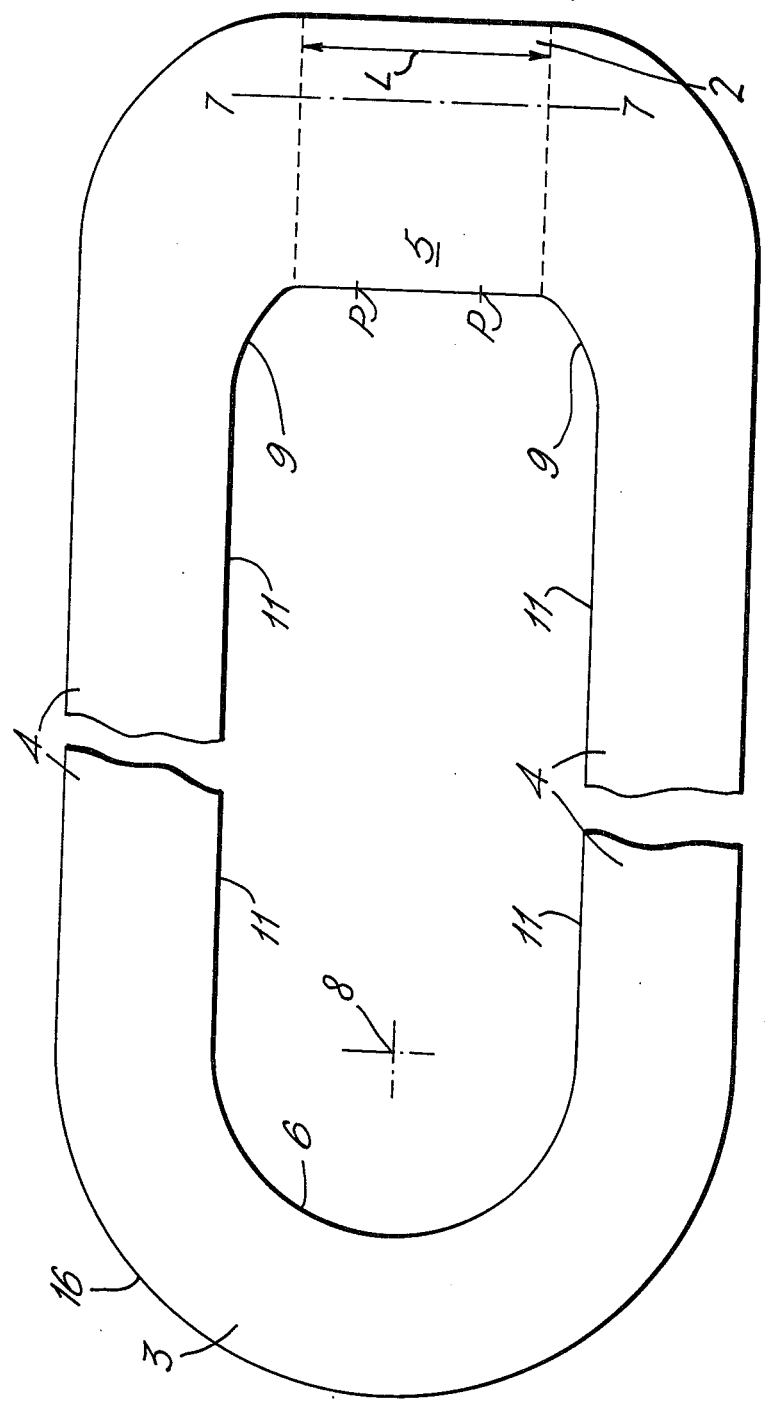

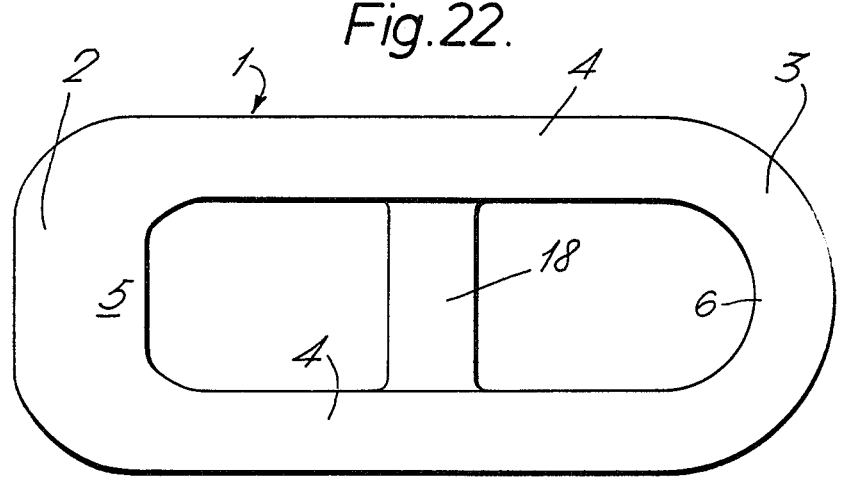
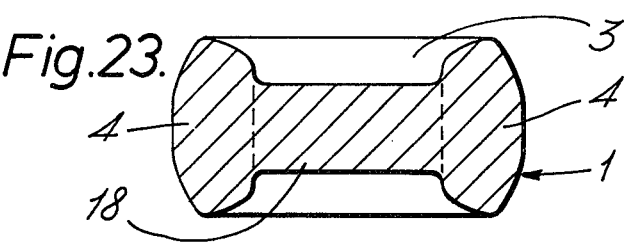
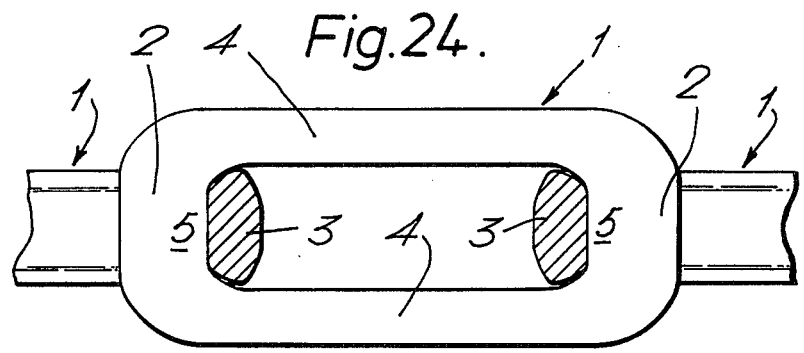

LINK CHAIN

The present invention relates to link chain, and particularly to link chain wherein each link comprises a pair of facing substantially U-shaped portions. Such chain is used for example in the mooring of ships, drilling rigs, barges and like vessels.

Conventionally in such link chain, each link is made from a round section bar which is forged to form two facing U-portions and then welded, while simultaneously being linked to the preceding formed link. A disadvantage of this conventional chain link, is that only single point contact occurs between links when the chain is tensioned. The Applicant's U.K. Pat. No. 1372354 overcomes this disadvantage by substituting the double U-link by a link comprised by a U-bar of rectangular cross-section with a pin joining the parallel leg portions of the U adjacent the free ends of the bar, so that in effect there is surface contact provided between the base of the U of one link and the connecting pin of the next following link. Each link has only one degree or mode of rotational freedom when the chain is forming a straight line under tension due to the constraint of the surfaces in contact.

It is desirable that the cross-sectional width of the bar equals approximately the length of the pin (or spacing of the bars legs) and that contact between links occurs over the entire length of the pin, to minimise bending movement at the pin/leg join.

However this structural characteristic can result in a pair of successive links being unable to pivot relative to each other about an axis transverse to the axis of the pin and this can cause severe bending stresses in the adjacent links when the chain is under tension while passing round an arcuate surface with the common pin axis perpendicular to the surface, for example, as occurs when passing through a hawse pipe.

It is an object of the present inventon to obviate or mitigate this disadvantage.

According to the present invention there is provided a link chain comprising a plurality of links joined together in sequence, each link including a closed member comprising a pair of facing U-shaped portions, the base of the U at the link end of one of a pair of joined links having a portion of its inside surface of part convex cylindrical form while the associated link end of the other link has a portion of its inside surface of part concave cylindrical form, the two part cylindrical surfaces mating with each other when the chain is straight under tension, while permitting relative pivoting of the joined links about the first axis substantially transverse to the longitudinal mid-plane of one link, of the pair, the linked U-ends of the linked pair being shaped to permit relative pivoting of the links about a second axis substantially transverse to the longitudinal mid-plane of the other link of the pair.

Preferably, the base of the U at each end of each member has a portion of its inside surface of part cylindrical form, the cylindrical axes of said portions being arranged substantially transversely with one portion convex and the other concave so that the part cylindrical convex surface of one end of one link mates with one part cylindrical concave surface at the other end of a preceding link when the chain is straight under tension.

Preferably the sections of each link are arranged such that when the chain is straight under tension, the profile of a transverse mid-section of the concave end substantially mates with the complementary profile of a mid-longitudinal section of the mating convex end. In particular, these profiles will have straight abutting base lines with substantially complementary arcuate side lines. Specifically the mid profile of the concave end will have convex side lines, and preferably the radius of curvature of part of these convex lines substantially equals the radius of the part cylindrical surfaces. However, in practice, a small clearance will be provided between the complementary arcuate side surfaces of the mating ends to allow for manufacturing tolerances. It is preferable that during relative pivoting of the link pair about said second axis of the concave line end maintains contact with the convex link end at at least two points, and preferably at three points. With this arrangement, the mating chain link ends can have part cylindrical surface contact when aligned and under load but when the chain passes over an arcuate surface successive links can pivot relative to each other about an axis transverse to the central plane of symmetry of the link containing the axis of the convex cylindrical surface while still maintaining adequate contact therebetween for supporting the load, and consequently build up of excessive bending moment stress in the chain links is avoided. Further the shoulders of the link adjacent the convex part-cylindrical surface are made relatively massive to minimise further stresses induced by bending moment.

A mid-stud or pillar can be provided in each link and secured to the substantially parallel sides of the link, to increase the resistance to deformation of the link when the chain is negotiating arcuate surfaces under tension. Each link can be conveniently made by a moulding process; and the mid stud will be preferably integral with the U-portions of the link.

Embodiments of the present invention will now be described by way of example with reference to the accompanying drawings in which:

FIG. 3 shows a cross-sectional end view through section N—N in FIG. 2;

FIG. 4 shows a side elevational view of the link ends to a larger scale;

FIG. 22 is a side view of a chain link generally as in FIG. 1 but including a mid-stud;

FIG. 23 is a transverse sectional view through the stud of FIG. 22; and

FIG. 24 shows joined links of a link chain according to a further embodiment of the present invention.

Figure 1:
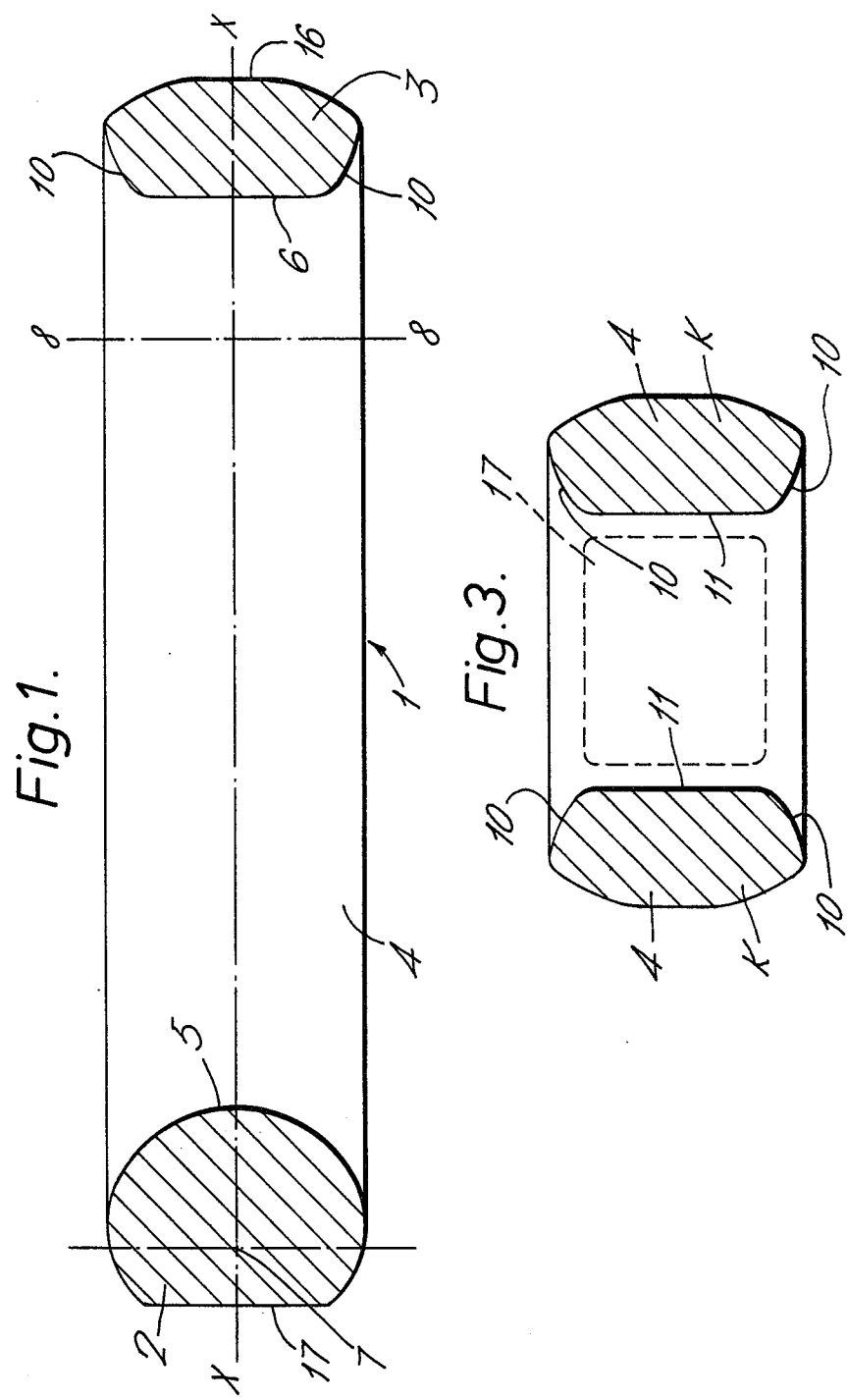
FIG. 1 shows a cross-sectional plan view of a link of an anchor chain, according to the present invention.

Referring to the drawings, a link chain for use in mooring a sea-going vessel; has each link 1 (FIG. 1) comprised by a pair of facing integral U-shaped end parts, 2, 3 which are integrally joined together to provide the link 1 with a pair of parallel leg portions 4, i.e. the link is of double U form. The links 1 of the present chain differ from the circular cross-section double U-form links of previous link chains in that the first U-end 2 of each link has an inwardly facing base portion 5 of convex form and specifically of truncated cylindrical form, while the second U-form 3 of the link has an inwardly facing base concave part 6 of semicylindrical form complementary to the convex surface 5 of the first end 2. The two part cylindrical surfaces 5, 6 have their axes 7, 8 at right angles to each other, so that the convex end surface of one link mates with the concave end surface of a preceding link or vice versa, when the chain is straight and under tension load. When said part-cylindrical surfaces 5, 6 are in complete contact, adjacent links 1 can pivot relative to each other only about the common axis of these surfaces 5, 6.

Figure 2:
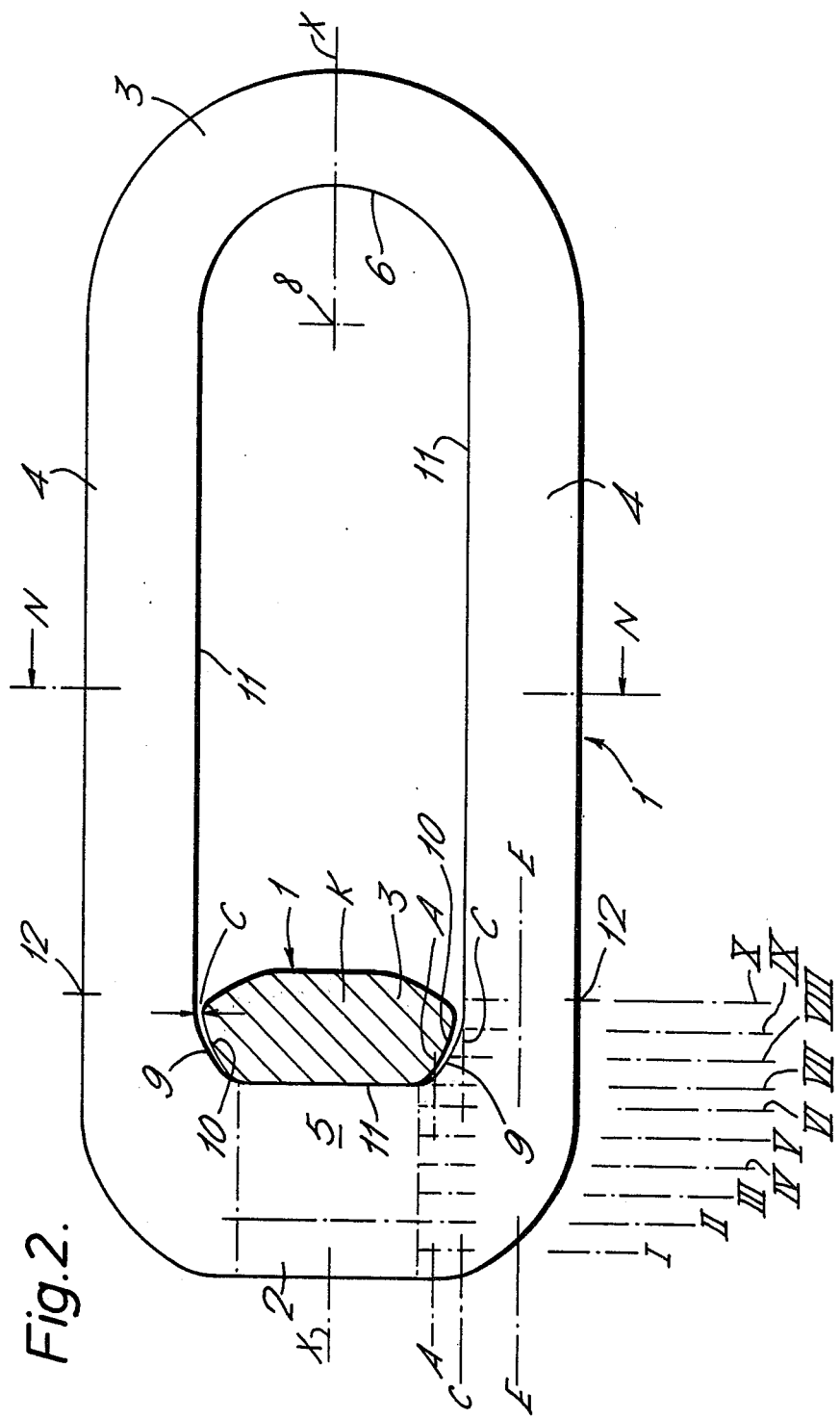
FIG. 2 shows a cross-sectional side view of the link of FIG. 1, through section X—X in FIG. 1, to a larger scale.
Figures 5, 6, 7, 8:
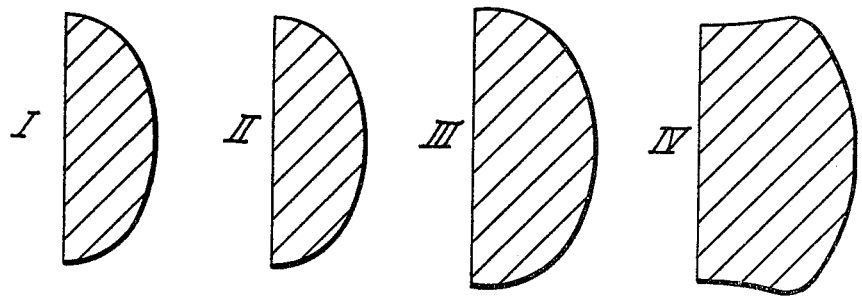
FIGS. 5 to 14 are transverse sectional views on a shoulder portion to the link of FIG. 2 taken on the sections I—I to X—X.
Figures 9, 10, 11:
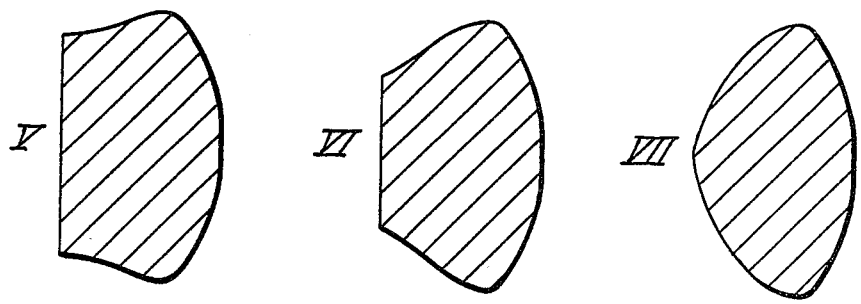
Figures 12, 13, 14:
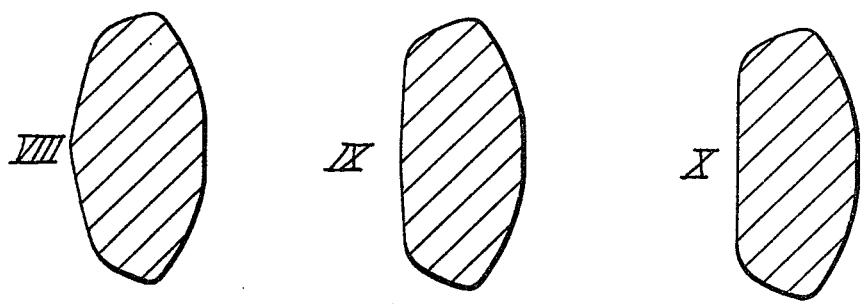
Figure 15:
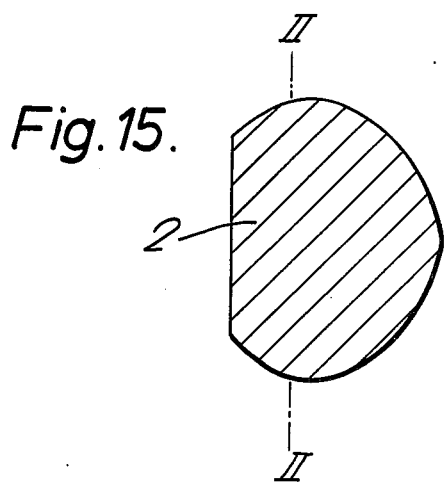
FIGS. 15 to 17 are longitudinal sectional views on the shoulder portion of the link of FIG. 1 taken on the sections A—A, C—C and E—E in FIG. 2.
Figure 16:
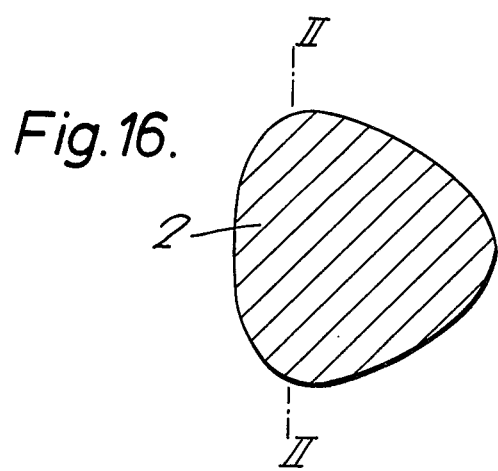
Figure 17:
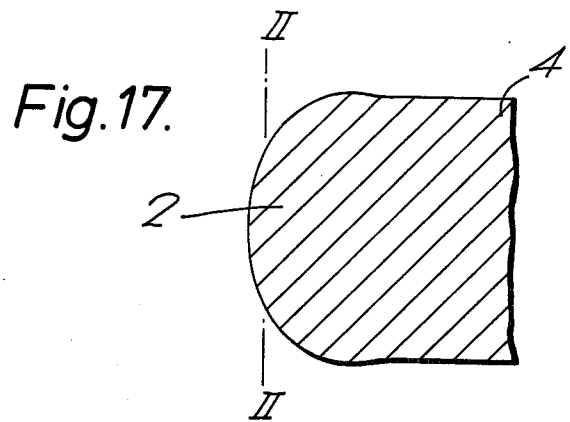
Figure 18:
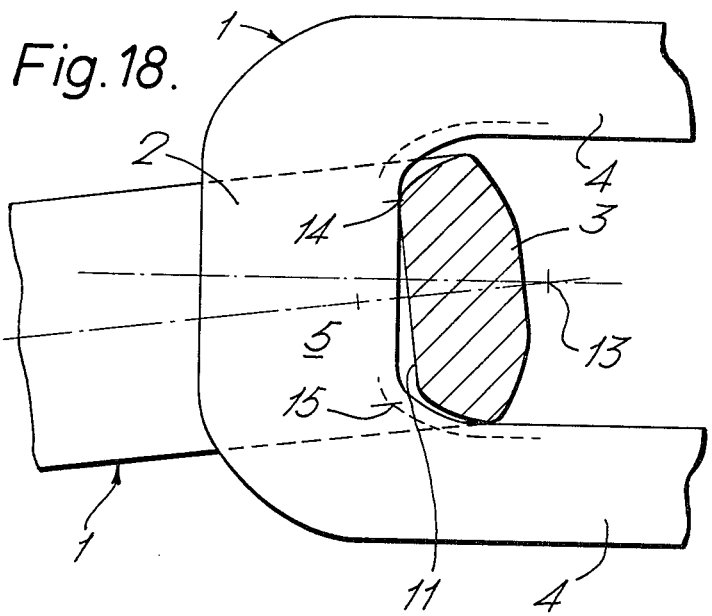
FIGS. 18 to 21 show sequential positions during relative pivoting between links.
Figure 19:
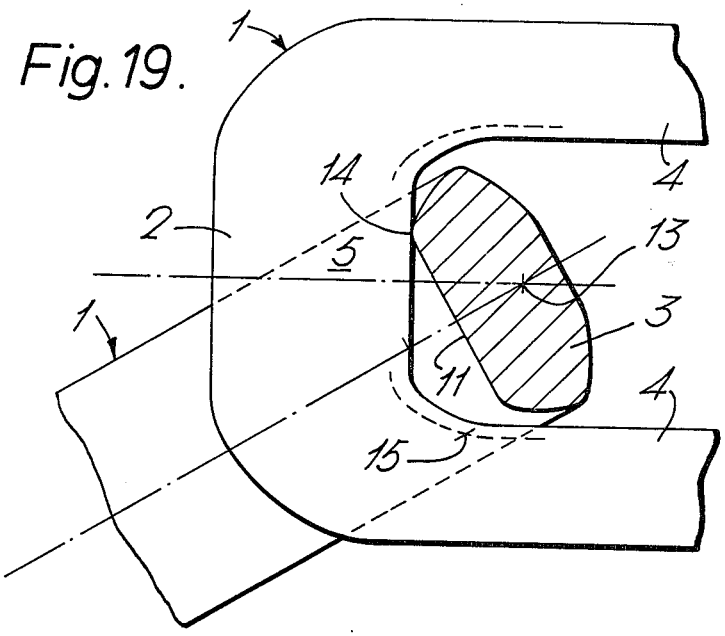
Figure 20:
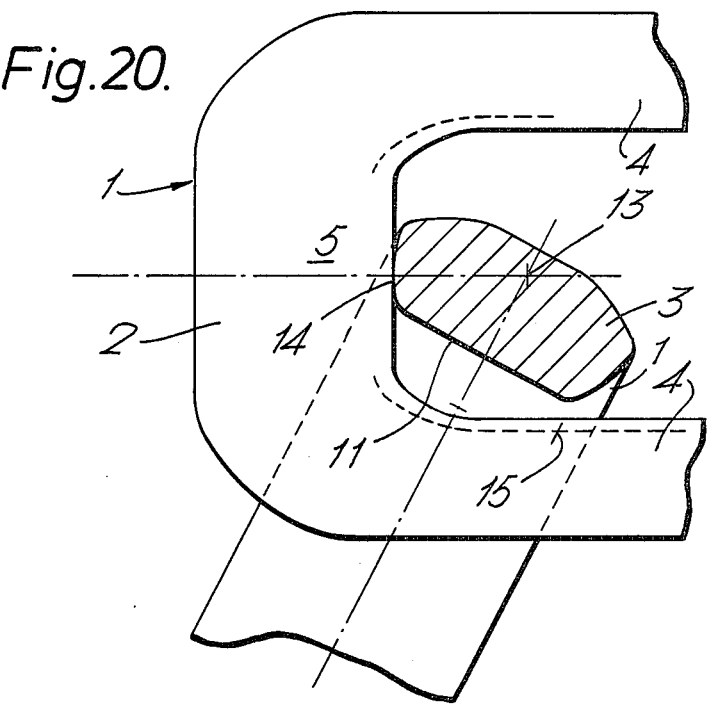
Figure 21:
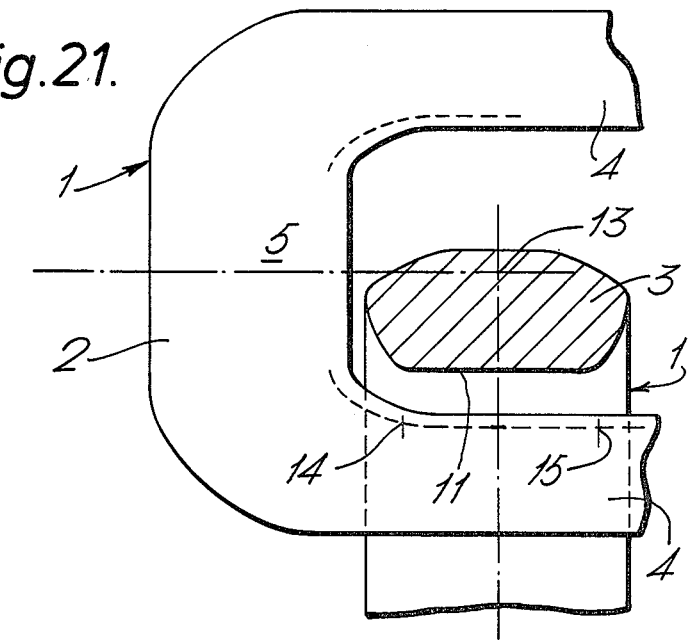

Additionally the first U-end 2 at the convex part-cylindrical end of each link 1 has a profile at the mid-longitudinal cross section (in the plane of the link see FIG. 2) characterised by a pair of concave side portions 9 flanking the straight part of the semi-cylindrical convex surface 5 while the matching transverse mid profile (see FIG. 1) of the second U-end 3 has a pair of convex side portions 10 substantially complementary to the concave side portions 9 of the first end 2. When the U-ends 2, 3 of successive links 1 mate under chain tension with the links aligned, these complementary profile portions 9, 10 substantially mate although in practice a small clearance is provided between the mating side portions 9, 10 to allow for manufacturing tolerances. FIGS. 5 to 17 illustrate the changing shape of each shoulder portion 9 as it blends from the semi-circular link inner surface 5 at end 2 to the flat inner surfaces 11 at the parallel leg portions 4. The link cross-section is constant (K) rightwards from the line 12—12 as viewed in FIG. 2, i.e. along the legs 4 and U-end 3. It is intended that during high tensile loading of the chain, these complementary mid profile portions will come into line contact due to elastic deformation thereby limiting the bending moment stresses present in the link shoulders 9 adjacent the convex part-cylindrical surfaces 5.

Additionally the coupled U-ends 2, 3 of successive links 1 can pivot (see FIGS. 18 to 21) relatively to each other about an axis 13 transverse to a central plane of symmetry of the link containing the axis of the concave cylindrical surface 6 while maintaining contact therebetween at at least two locations 14, 15, and normally at three locations, one 14 on the convex part-cylindrical surface 5 and two 15 straddling the shoulders 9, whereby the chain can pass around arcuate surfaces, e.g. hawse pipes, without the excessive bearing stresses which would arise with single point contact.

Bearing in mind the restriction concerning the mating end surfaces 2, 3, the cross-sectional profile around the link 1 can be varied to give optimum strength for the least amount of material. In particular, the side shoulder portions 9, 10 of the U-ends 2, 3 flanking both concave and convex semi-cylindrical surface can be made relatively massive to minimise local stress concentration induced by bending moment. By way of example, a link having a breaking load of 470 tons could be made of oil rig quality steel and have an overall length of 420 mm; a depth of 178 mm. and a width of 90 mm: the cross-sectional profile over the leg portions 4 and the second U-end part 3 would be constant having a straight line at the inner surface 11 and generally arcuate lines corresponding to the side 10 and outer surfaces 16: the concave part-cylindrical surface 6 of the second U-end 3 would have a radius of 47 mm. (the spacing of the legs 4 being 94 mm.), and the convex part-cylindrical surface 5 of the first U-end 2 will also have a radius of 47 mm., this end in fact having a truncated circular cross-sectional profile (see FIG. 1) comprising a straight line 17.75 mm. long and a 248° arc of a circle of radius 47 mm. The profile blends smoothly through the relatively massive shoulder portions 9 into the profile of the legs 4 and second link end 3. To cater for manufacturing tolerances, a maximum clearance C (FIG. 2) of 5 mm. is provided between the shoulder portions 9 and the truncated circular cross-section profile of the mating ends 2, 3. The part-cylindrical surfaces 5 have a length L of 62 mm. and the outer edges of the profile of the shoulders 9 of the first end have a 74 mm. radius from point P, FIG. 4, on the cylindrical surface 5 spaced 16 mm. from the longitudinal axis of the link.

A mid stud or pillar 18 (FIGS. 22, 23) may be provided between the legs 4 and integral therewith to strengthen the link 1.

The link chain described above can be made conveniently by a casting process using for example a shell moulding method using resin bonded sand shells. In this method the said shells are assembled around the preceding link and the following link is cast in the shells so as to be formed in the link condition with the preceding link. Alternatively, polystyrene mould links could be used in the moulding process, which polystyrene links are destroyed during the process.

In the embodiment of FIG. 24, each chain link 1 is symmetrical about the transverse mid-plane, and the chain comprises alternating links which respectively have similar ends 2 and similar ends 3 as can be seen in the drawing. Relative pivoting of adjacent links 1 can occur exactly as shown in FIGS. 18 to 21.

The above chain according to both embodiments of the present invention provides integral chain links 1 (with or without integral mid studs) of double U-form 2, 3, which is in contrast to the single U-end links of the chain of the U.K. Pat. No. 1,372,354. However, the above chain according to the present invention again provides advantageous surface contact between succeeding links in the manner of U.S. Pat. No. 1,372,354, but has the additional advantage of allowing the chain to pass around an arcuate surface without excessive bending stresses being induced in adjacent links when the common axis of the mating surfaces is perpendicular to the arcuate surface.

I claim:

1. A link chain comprising a plurality of links joined together in sequence, each link including a closed member comprising a pair of facing U-shaped portions joined by substantially parallel leg portions, the base of the U at the link end of one of a pair of joined links having a portion of its inside surface as a part convex cylindrical surface while the associated link end of the other link has a portion of its inside surface as a part concave cylindrical surface, the two part cylindrical surfaces mating with each other when the chain is straight under tension, while permitting relative pivoting of the joined links about a first axis substantially transverse to the longitudinal mid plane of one link of the pair, the part-cylindrical convex surface of said one link end having arcuate shoulder portions blending into the parallel leg portions of the link and said part-cylindrical concave surface of said associated link end having arcuate side wall portions substantially complementary to the arcuate shoulder portions of said one link end to permit relative pivoting of the links about a second axis substantially transverse to the longitudinal mid-plane of the other link of the pair.

2. A link chain as claimed in claim 1, wherein the base of the U at each end of each link member has a portion of its inside surface of part cylindrical form, the cylindrical axes of said portions being arranged substantially transversely with one portion convex and the other concave so that the part cylindrical convex surface of one end of one link mates with one part cylindrical concave surface at the other end of a preceding link when the chain is straight under tension.

3. A link chain as claimed in claim 1, wherein a mid-stud is provided in each link and secured to the substantially parallel sides of the link.

4. A link chain as claimed in claim 1, wherein the links are made by a moulding process.

5. A link chain as claimed in claim 1, wherein the sections of each link are arranged such that when the chain is straight under tension, the profile of a transverse mid-section of the concave end substantially mates with the complementary profile of a mid-longitudinal section of the mating convex end.

6. A link chain as claimed in claim 5, wherein the mid profiles of the concave end has convex side lines.

7. A link chain as claimed in claim 6, wherein the radius of curvature of part of the convex lines substantially equals the radius of the part cylindrical surfaces.

8. A link chain as claimed in claim 1, wherein during relative pivoting of the link pair about said second axis when the chain is under tension around an arcuate surface the concave link end maintains contact, with the convex link end at at least two points.

9. A link chain as claimed in claim 8, wherein the concave link end maintains contact with the convex link end at three points during said relative pivoting about the second axis.

* * * * *